(12) United States Patent
Gieger et al.

(10) Patent No.: US 10,601,170 B2
(45) Date of Patent: Mar. 24, 2020

(54) SOLID DIELECTRIC DEADFRONT ELECTRICAL SWITCH ASSEMBLY

(71) Applicant: Thomas & Betts International LLC, Wilmington, DE (US)

(72) Inventors: Jeffrey Gieger, Dingmans Ferry, PA (US); Ian Christopher Waleck, Milford, PA (US); Charles Bindics, Northampton, PA (US)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 16/159,430

(22) Filed: Oct. 12, 2018

(65) Prior Publication Data
US 2019/0148877 A1 May 16, 2019

Related U.S. Application Data

(60) Provisional application No. 62/571,543, filed on Oct. 12, 2017.

(51) Int. Cl.
| | |
|---|---|
| *H01R 13/53* | (2006.01) |
| *H01R 13/11* | (2006.01) |
| *H01R 13/641* | (2006.01) |
| *H01H 1/24* | (2006.01) |
| *H02B 13/00* | (2006.01) |

(Continued)

(52) U.S. Cl.
CPC ............... *H01R 13/53* (2013.01); *H01H 1/24* (2013.01); *H01H 1/38* (2013.01); *H01H 31/32* (2013.01); *H01H 33/02* (2013.01); *H01R 13/11* (2013.01); *H01R 13/641* (2013.01); *H02B 3/00* (2013.01); *H02B 13/005* (2013.01); *H01R 13/6485* (2013.01); *H01R 13/6666* (2013.01); *H01R 13/713* (2013.01); *H01R 13/7135* (2013.01)

(58) Field of Classification Search
CPC ............... H01R 13/53; H01R 13/6485; H01R 33/7678; H01R 13/6666; H01R 13/7135; H01R 13/713
USPC .................................................... 439/181, 88
See application file for complete search history.

(56) References Cited

U.S. PATENT DOCUMENTS

| | | |
|---|---|---|
| 3,552,777 A | 1/1971 | Heinrich |
| 4,990,108 A | 2/1991 | Sakaguchi |

(Continued)

*Primary Examiner* — Abdullah A Riyami
*Assistant Examiner* — Justin M Kratt
(74) *Attorney, Agent, or Firm* — Taft Stettinius & Hollister LLP; J. Bruce Schelkopf

(57) ABSTRACT

A solid dielectric deadfront electrical switch assembly having a switch contact assembly. The switch contact assembly can include an upper insulative diaphragm, a male pin contact having an insulating tip and an isolating sleeve, a primary contact, a lower insulative diaphragm, and a female socket contact. The upper insulative diaphragm, isolating sleeve, and insulating tip can assist in electrically isolating the male contact pin when the electrical switch assembly is in an open condition. Further, the upper insulative diaphragm can be separated from the female socket contact, and/or a female-contact insulating sleeve, by a gap chamber that utilizes air as an insulator. The lower insulative diaphragm can be configured to engage a drive rod that is used to axially displace the male pin contact between open and closed positions in a manner that may prevent arcing between the switch contact assembly and a base plate of a switchgear.

20 Claims, 8 Drawing Sheets

(51) Int. Cl.
*H01H 31/32* (2006.01)
*H01H 33/02* (2006.01)
*H02B 3/00* (2006.01)
*H01H 1/38* (2006.01)
H01R 13/648 (2006.01)
H01R 13/66 (2006.01)
H01R 13/713 (2006.01)

(56) References Cited

U.S. PATENT DOCUMENTS

| | | |
|---|---|---|
| 5,336,104 A | 8/1994 | Nagamine |
| 5,490,799 A | 2/1996 | Yamamoto |
| 6,336,832 B2 | 1/2002 | Nobe |
| 6,561,841 B2 | 5/2003 | Norwood |
| 6,836,402 B1 | 12/2004 | Huang |
| 7,144,279 B2 | 12/2006 | Zahnen |
| 7,148,441 B2 | 12/2006 | Daharsh |
| 7,361,039 B2 | 4/2008 | Koehler |
| 7,497,723 B2 | 3/2009 | Brassell |
| 7,568,933 B2 | 8/2009 | Shirai |
| 7,591,668 B2 | 9/2009 | Nakamura |
| 7,717,740 B2 | 5/2010 | Koehler |
| 7,754,992 B2 | 7/2010 | Stepniak et al. |
| 7,963,782 B2 | 6/2011 | Hughes |
| 8,388,381 B2 | 3/2013 | Borgstrom |
| 8,408,925 B2 | 4/2013 | Borgstrom |
| 2012/0193325 A1* | 8/2012 | Borgstrom ............. H01H 33/42 218/154 |
| 2014/0346023 A1 | 11/2014 | Siebens |
| 2015/0027986 A1* | 1/2015 | Siebens ................. H01H 11/00 218/93 |

\* cited by examiner

SOLID DIELECTRIC DEADFRONT ELECTRICAL SWITCH ASSEMBLY

CROSS REFERENCE TO RELATED APPLICATIONS

The present application claims the benefit of U.S. Provisional Patent Application Ser. No. 62/571,543, which was filed on Oct. 12, 2017, and is incorporated herein by reference in its entirety.

FIELD OF INVENTION

The present invention relates to electrical switch assemblies for use with electric power distribution systems, and more particularly, to electrical switch assemblies configured to electrically isolated mating electrical contacts in a relatively small envelope.

BACKGROUND

Electrical switch assemblies can be configured to open or close an electric circuit. For example, an electrical switch assembly can be configured to open an electrical circuit such that a worker can relatively safely perform maintenance or repair work to the electrical circuit and/or related components. At least certain types of electrical switch assemblies are used in the transmission of relatively high levels of electrical power, including, for example, electrical power in the range of around 600 amps, among other ranges. In efforts to prevent arcing between at least contacts of an electrical switch assembly when the electrical switch assembly is in an open condition, certain types of electrical switch assemblies are configured to separate the contacts of the electrical switch assembly by relatively large distances. Yet, such relatively large distances can increase the overall size of the electrical switch assembly, which can not only increase the cost of the electrical switch assembly, but may also require that the electrical switch assembly occupy a relatively large portion of an otherwise generally confined or limited space or area. Alternatively, certain types of electrical switch assemblies seek to prevent arcing by adding a supplemental insulating medium, such as, for example, oil, between the open contacts. Yet, the inclusion of oil and other supplemental insulating materials can at least add to the cost and complexity of the electrical switch assembly.

Accordingly, although various electrical switch assemblies are available currently in the marketplace, further improvements are possible to provide a means for preventing arcing in electrical switch assemblies.

BRIEF SUMMARY

An aspect of an embodiment of the present application is an apparatus having a housing that defines a bore, and can further include a primary contact and a female socket contact that can be positioned within the bore. The apparatus can also include a male pin contact that is axially displaceable within the bore between a first position and a second position. The male pin contact can have an insulating tip and a pin body, the insulating tip being coupled to an upper portion of the pin body. Additionally, the insulating tip can have a first outer size and the upper portion of the pin body can have a second outer size, the second outer size being larger than the first outer size. The apparatus can also include an upper insulative diaphragm having a first bore that can have a first inner size that is approximately the same as the first outer size of the insulating tip. When the male pin contact is at the first position, the insulating tip, and not the upper portion of the pin body, can be positioned within the first bore and the male pin contact is not electrically coupled to the primary contact and the female socket contact. Additionally, the upper insulative diaphragm can be configured to accommodate passage of at least a portion of the upper portion of the pin body as the male pin contact is axially displaced between the first position and the second position. Further, when the male pin contact is at the second position, the male pin contact can be in electrical communication with both the first contact and the second contact.

Another aspect of an embodiment of the present application is an apparatus comprising a housing having a bore and a male contact interface, and in which at least a portion of a contact interface assembly is housed within the male contact interface. The apparatus can also include an upper insulative diaphragm having a first bore, the upper insulative diaphragm being constructed from an electrically non-conductive material. The apparatus can further include a primary contact that is construed from an electrically conductive material, the primary contact being positioned within the bore and electrically coupled to the contact interface assembly. The apparatus can also include a female socket contact that is construed from an electrically conductive material and is positioned within the bore, the upper insulative diaphragm being positioned between the female socket contact and the primary contact. Additionally, the apparatus can include a male pin contact having an insulating tip, the male pin contact being axially displaceable between a first position and a second position along at least the primary contact and the upper insulative diaphragm. The male pin contact can be electrically coupled to the female socket contact when in the second position, and not electrically coupled to the female socket contact when in the first position. Additionally, the first bore can have a first size when engaged by the insulating tip when male pin contact is in the first position, and a second size when engaged by another portion of the male pin contact when the male pin contact is in the second position, the first size being smaller than the second size.

Additionally, an aspect of an embodiment of the present application is an apparatus that includes a housing having an outer jacket and an insulating jacket, a portion of the insulating jacket extending from the outer jacket and configured to provide a contact interface. Further, the contact interface can be positioned around at least a portion of an interface contact assembly. The apparatus can also include an upper insulative diaphragm having a first bore and a second bore, the first bore having a first inner size, the second bore being in fluid communication with the first bore and having a second inner size that is larger than the first inner size. Additionally, the apparatus can include a lower insulative diaphragm having an inner surface that generally defines an opening through the lower insulative diaphragm, the lower insulative diaphragm being positioned in an opening at an end of the housing. The apparatus can also include a primary contact positioned within the housing between the upper insulative diaphragm and the lower insulative diaphragm. The primary contact being electrically coupled to the interface contact assembly, the primary contact having a central hole. A female socket contact of the apparatus can be constructed from an electrically conductive material, and at least a portion of an outer surface of the female socket contact can be housed in a female contact-insulating sleeve. Further, the upper insulative diaphragm can be positioned between the female socket contact and the primary contact.

The apparatus can further include a male pin contact that extends between a first end and a second end, male pin contact including a pin body and an insulating tip, the insulating tip being positioned at the first end and coupled to an upper portion of the pin body. The insulating tip can have a first outer size that is approximately the same as the first inner size of the first bore. The upper portion can have a second outer size that is approximately the same as the second inner size of the second bore. At least a portion of the male pin contact can be sized for reciprocal displacement within the central hole of the primary contact and the first and second bores of the upper insulative diaphragm. The apparatus can also include a drive rod that can be coupled to the second end of the male pin contact. The drive rod can have an outer size that is approximately the same as an inner size of the opening of the lower insulative diaphragm.

Further, according to an embodiment of the present application, a solid dielectric deadfront electrical switch assembly includes a housing, made from an insulating material, defining a bore therein, a current carrying contact disposed within the housing, a male pin contact disposed within the bore and in electrical communication with the current carrying contact, a female socket contact disposed within the bore and dimensioned to receive a first contact end of the male pin contact, and a viewing window positioned on the housing such that the position of the male pin contact is visible therethrough. The male pin contact can be axially movable within the bore to transition between an open and closed position.

These and other aspects of the present invention will be better understood in view of the drawings and following detailed description.

BRIEF DESCRIPTION OF THE DRAWINGS

The description herein makes reference to the accompanying figures wherein like reference numerals refer to like parts throughout the several views.

Figure 1:
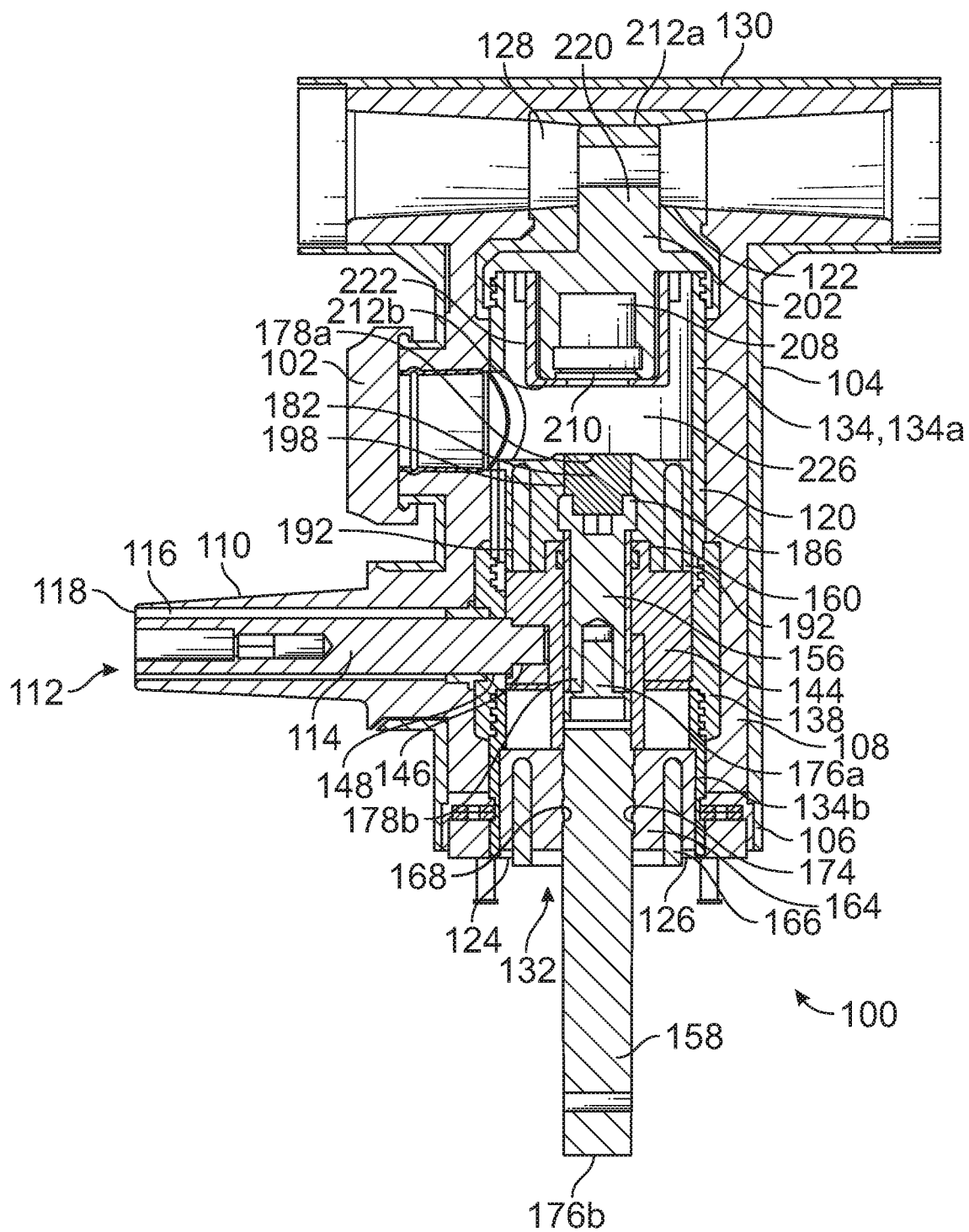
FIG. 1 illustrates a cross-sectional view of an exemplary electrical switch assembly according to an embodiment of the present application in an open condition.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 2:
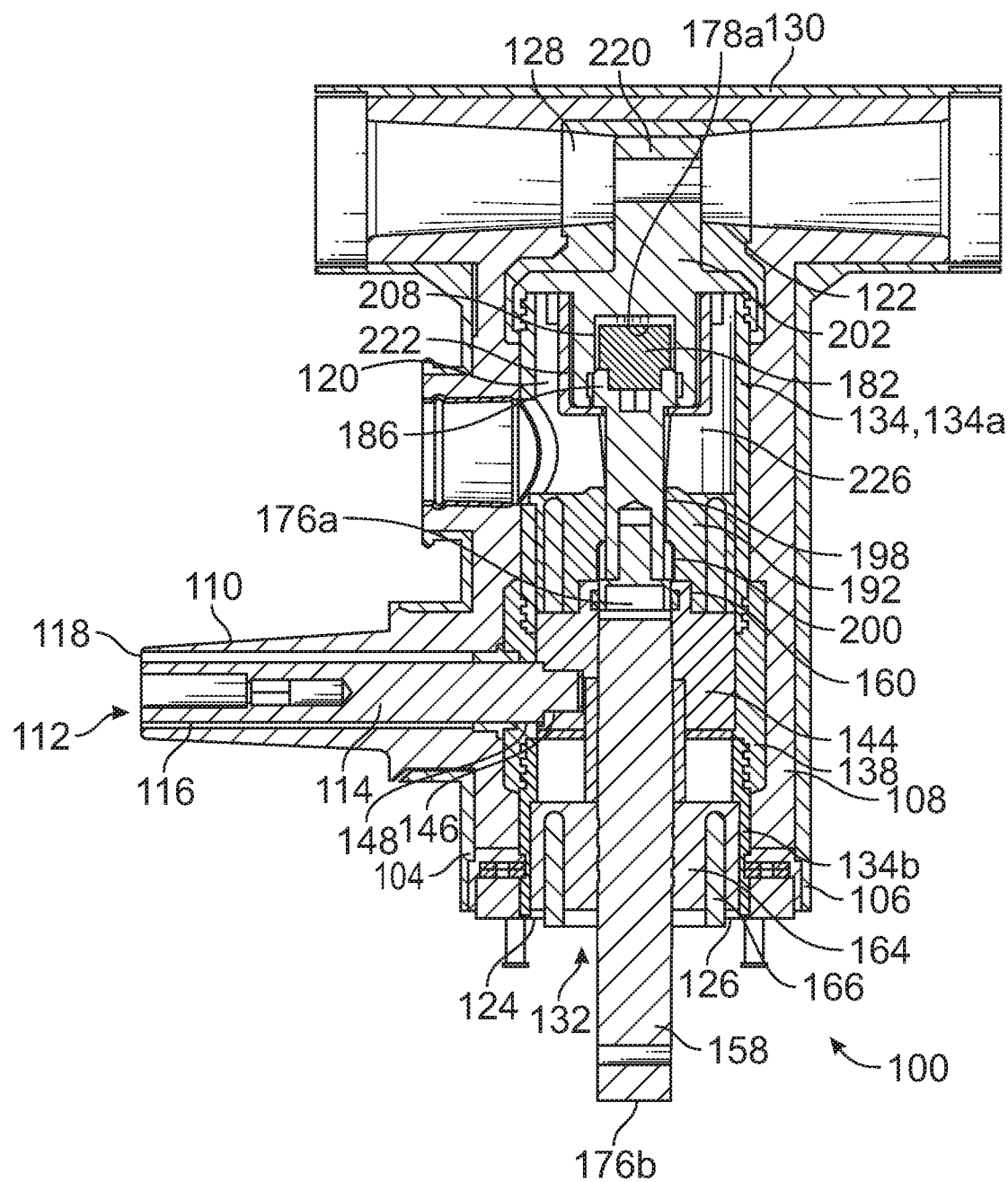
FIG. 2 illustrates a cross-sectional view of the exemplary electrical switch assembly shown in FIG. 1 in a closed position.

FIGS. 1 and 2 illustrate an exemplary electrical switch assembly 100 adapted to make or break an electrical circuit. More specifically, as discussed below, the electrical switch assembly 100 is adapted to open and close an electrical circuit via movement of a moveable contact, and thus can be used at least in connection with controlling the delivery of electrical power to an electrical circuit. Additionally, according to certain embodiments, the electrical switch assembly 100 is designed and constructed such that it provides a means, e.g., a viewing window 102, for visually confirming the position and/or status of the movable contact and/or of the electrical switch assembly 100, as will be described in more detail below. According to certain embodiments, the electrical switch assembly 100 can be used in conjunction with a switchgear, and thus can act as a secondary device that can further isolate a circuit, in addition to providing visual access to the status of the contacts and/or of the electrical switch assembly 100 through the viewing window 102 during at least service or maintenance on the circuit. The illustrated electrical switch assembly 100 can be constructed from a variety of different materials having suitable properties for the associated application, including, for example, suitable properties relating to strength, weight, and/or rigidity, among other properties.

While directional terms, such as top, bottom, upper, and lower are referenced below to an orientation in which the electrical switch assembly 100 as depicted in the accompanying figures, the present application is not thereby limited to use in any particular orientation.

According to the exemplary electrical switch assembly 100 depicted in FIGS. 1 and 2, the electrical switch assembly 100 includes a housing 104 that extends between opposite ends of the electrical switch assembly 100. According to certain embodiments, the housing 104, which can have a generally cylindrical configuration, can be constructed to provide the electrical switch assembly 100 with deadfront characteristics, including, for example, constructed such that an operator or worker is not directly exposed to electrically live parts. Moreover, such a deadfront construction can prevent or eliminate the possibility that a worker may be directly exposed to at least portions of the electrical switch assembly 100 that may be electrically live. For example, according to the illustrated embodiment, the housing 104 can include a conductive outer jacket 106 that can be formed or molded from a variety of different types of materials, including, for example, a conductive (or semi-conductive)

peroxide-cured synthetic rubber, commonly referred to as EPDM (ethylene-propylene-dienemonomer), among other materials. The outer jacket 106 can house, or be molded upon, at least a portion of an insulating jacket 108 of the housing 104. The insulating jacket 108 can be formed or molded from a variety of types of insulating materials, including, but not limited to, rubber, synthetic rubber, plastic, and/or EPDM, among other materials.

As shown in at least FIGS. 1 and 2, according to the illustrated embodiment, a portion of the insulating jacket 108 can provide a contact interface 110, including, for example, a male contact interface. The contact interface 110 can be configured to be positioned about and/or around at least a portion of an interface contact assembly 112. According to at least certain embodiments, the contact interface 110 can, for example, be adapted to be coupled to a mating female contact interface that is coupled to a power cable or line such that electrical power can be transmitted from the power cable or line and to the electrical switch assembly 100 via at least the interface contact assembly 112. According to certain embodiments, the interface contact assembly 112 can include a conductive sleeve 114 and a conductive or semi-conductive insert or shielding layer 116, the insert 116 inwardly extending from an outer end 118 of the contact interface 110 and positioned about at least a portion of the conductive sleeve 114.

The housing 104 can also define, or be molded to define therein, a bore 120 that generally extends between a first end 122 to a second end 124 of the bore 120 along a central longitudinal axis of the housing 104. According to the illustrated embodiment, the bore 120 can provide an opening 126 at a second end 124 of the housing 104, and terminates at a passageway 128 of an electrical connector 130, such as, for example, a female connector, among other electrical connectors, of the electrical switch assembly 100. Additionally, as shown in FIGS. 1 and 2, the bore 120 can house at least a portion of a switch contact assembly 132 of the electrical switch assembly 100, as discussed below.

Figure 3:
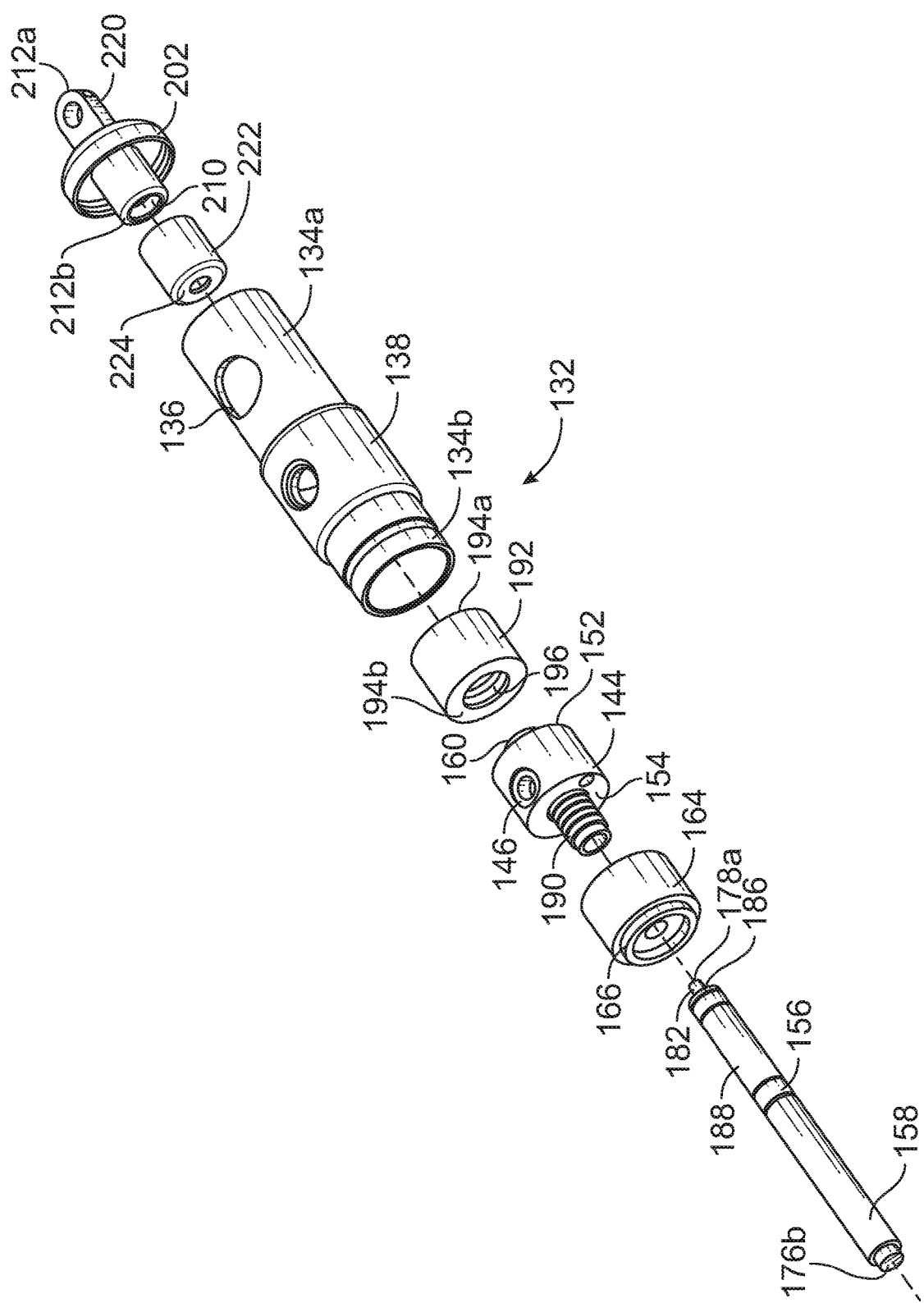
FIG. 3 illustrates an exploded perspective view of an exemplary switch contact assembly for an electrical switch assembly according to an embodiment of the present application.

FIG. 3 illustrates an exploded perspective view of a switch contact assembly 132 according to an embodiment of the present application. As shown in FIG. 3, as well as FIGS. 1 and 2, the switch contact assembly 132 can include an insulative sleeve 134 that can abut against an interior side of the insulating jacket 108. According to the illustrated embodiment, the insulative sleeve 134 can comprise an upper sleeve 134a and a lower sleeve 134b (collectively insulative sleeve 134). According to the illustrated embodiment, the insulative sleeve 134 is constructed from an electrically insulative material, such as, for example, a rubber or plastic. Additionally, according to certain embodiments, the insulative sleeve 134 can provide at least a degree of rigidity to the electrical switch assembly 100. Further, as shown in at least FIG. 3, the upper sleeve 134a can include an opening 136 that is positioned such that, when the electrical switch assembly 100 is assembled, the upper sleeve 134a may not interfere with visual assess through the viewing window 102 to at least a gap chamber in the electrical switch assembly 100, and/or visual access to the position, and thus the status, of one or more contacts of the electrical switch assembly 100.

As shown in FIGS. 1-3, according to the illustrated embodiment, the switch contact assembly 132 can also include a shield 138 that is positioned between, and separates, the upper and lower insulative sleeves 134a, 134b. According to certain embodiments, the shield 138 can be constructed from a semi-conductive electrical material. According to the illustrated embodiment, as shown in FIGS. 1 and 2, an inner surface of the shield 138 can be configured to provide an upper shoulder 140a and a lower shoulder 140b that may abut against adjacent portions of the upper and lower insulative sleeves 134a, 134b, respectively. The upper and lower insulative sleeves 134a, 134b and the shield 138 can be configured and aligned such that, collectively, the upper and lower insulative sleeves 134a, 134b and the shield 138 provide a cavity 142 (FIG. 4) in the switch contact assembly 132 that can house other portions of the switch contact assembly 132.

The switch contact assembly 132 can also include a primary, or current carrying, contact 144 that can be positioned within the cavity 142, and more specifically, within the shield 138. According to the illustrated embodiment, the primary contact 144 can be constructed from an electrically conductive material, such as, for example, copper or aluminum, among other electrically conductive materials. Further, as shown in at least FIGS. 1-3, the primary contact 144 can include an aperture 146 that is aligned with an opening 148 in the shield 138. Further, the aperture 146 of the primary contact 144 can be positioned to receive placement of at least a portion of, the interface contact assembly 112, such as, for example, the conductive sleeve 114, such that electrical power received by the interface contact assembly 112 flows to the primary contact 144.

According to the illustrated embodiment, the primary contact 144 is disposed approximately in the middle of the cavity 142. Further, as shown in at least FIGS. 4-5, the primary contact 144 can have a central hole 150 that extends between an upper surface 152 and a bottom surface 154 of the primary contact 144. The central hole 150 can be dimensioned to accommodate reciprocal linear displacement of at least a portion of at least both a male pin contact 158 and a drive rod 158 therewithin as the status of the electrical switch assembly 100 is changed between open and closed conditions.

The primary contact 144 can include an upper hub 160 that extends from an upper surface 152 of the primary contact 144 that is configured to house, or otherwise be coupled to, a first contact 162 (FIGS. 4 and 5), such as, for example, louver or rib style contacts. The first contact 162 can be configured to, when the male contact pin 156 is in the closed position, be in electrical communication with both the primary contact 144 and the male pin contact 156 such that electrical power can be delivered from the primary contact 144 to the male contact 156 through the first contact 162. According to certain embodiments, the first contact 162 comprises louver style contacts that are formed from the upper surface 152 of the primary contact 144 and generally extends upwardly therefrom.

According to the illustrated embodiment, at least a portion of the lower insulative diaphragm 164 is constructed from an electrically non-conductive, or insulative, material, such as, for example, silicone. Additionally, according to certain embodiments, the insulative material of the lower insulative diaphragm 164 may be positioned around, and/or be molded about, one or more support ribs 166 that can be constructed from a different non-conductive material, such as, for example, plastic. For example, according to the illustrated embodiment, one or more support ribs 166 can extend within a midsection of the lower insulative diaphragm 164, and be configured to increase a stiffness of the lower insulative diaphragm 164. The lower insulative diaphragm 164 can include an outer surface that is configured to abut an inner surface of the lower sleeve 134b. Additionally, the lower insulative diaphragm 164 can be positioned in a lower portion of the bore 120 of the housing 104, and more specifically, within the lower insulative sleeve 134*b*. For example, according to certain embodiments, at least a portion of the lower insulative diaphragm 164, as well as a portion of the lower sleeve 134*b*, can extend outwardly through, and beyond, the opening 126 of the housing 104.

Figure 8:
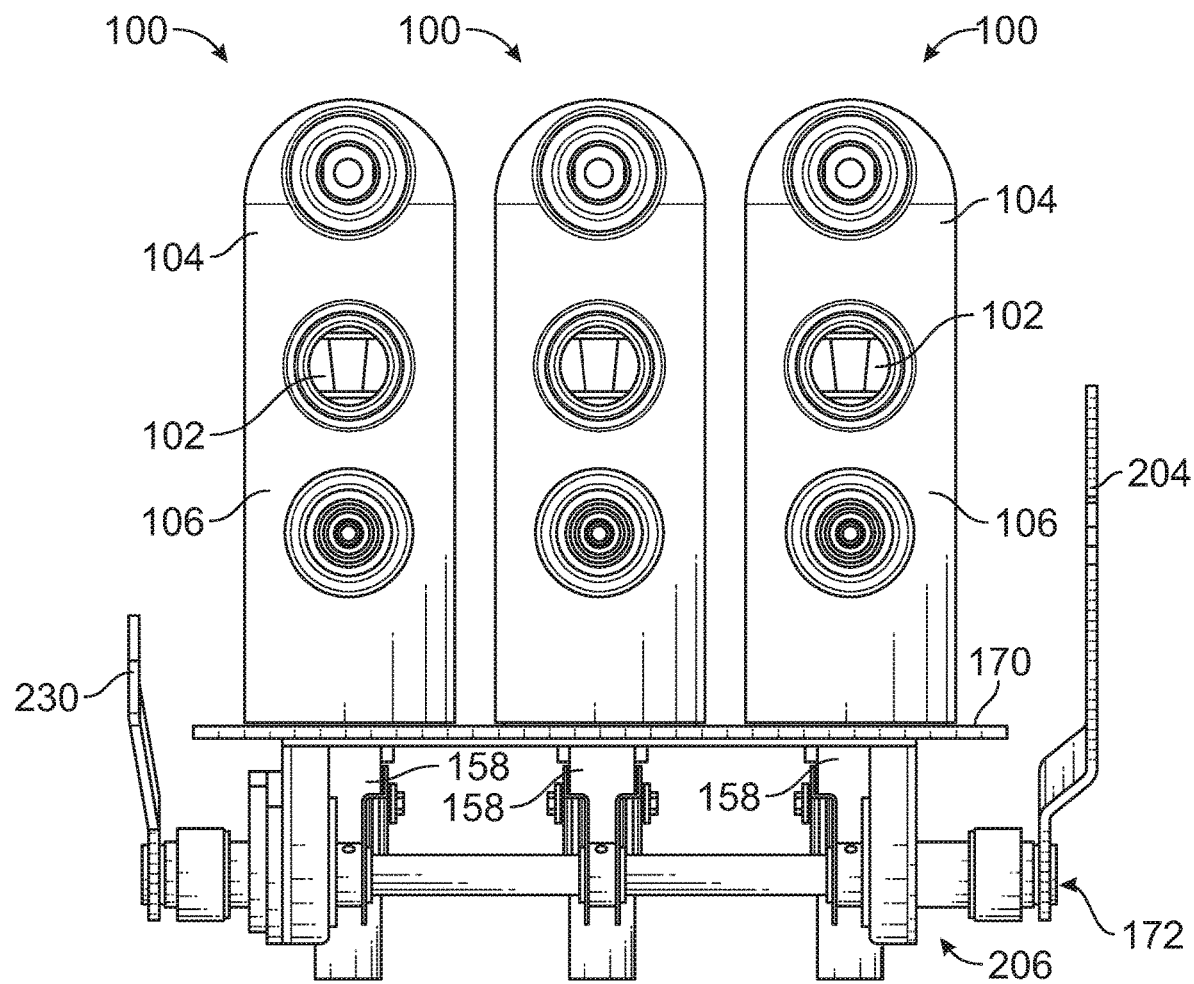
FIG. 8 illustrates a front view of the electrical switch assembly in FIG. 1 installed on a portion of a three-phase switchgear.

The lower insulative diaphragm 164 can also include an inner surface 168 that is configured to abut an opposing outer surface of the drive rod 158. According to an illustrated embodiment, the inner surface 168 of the lower insulative diaphragm 164 can have a size, such as, for example, a diameter, that, in connection with the opposing outer surface of the drive rod 158, prevents potential arcing from the primary contact 144 and/or the male pin contact 156 through the opening 126 of the housing 104. For example, according to certain embodiments, the inner surface 168 of the lower insulative diaphragm 164 can have a size that provides an interference fit with the opposing outer surface of the drive rod 158. Thus, for example, according to certain embodiments, the lower insulative diaphragm 164 can have a size relative to at least the drive rod 158 and/or the lower sleeve 134*b* that can prevent potential arcing between the male pin contact 156 and/or the primary contact 144 and another relatively adjacent structure, such as, for example, a base plate 170 of a switchgear 172 (FIG. 8).

Additionally, according to certain embodiments, the inner surface 168 of the lower insulative diaphragm 164 can have one or more inwardly recessed grooves 174 that can retain at least some lubricating material, such as, for example, grease. Such retention of a lubricating material can improve the ease with which the drive rod 158 can be linearly displaced within at least the lower insulative diaphragm 164 as the electrical switch assembly 100 is changed between the open and closed conditions.

The drive rod 158 can extend between a first end 176*a* and a second end 176*b* of the drive rod 158. Additionally, the drive rod 158 can be constructed from a variety of different materials, including, for example, fiberglass. As shown by at least FIG. 8, the second end 176*b* of the drive rod 158 can be coupled to a switchgear 172. Operation of the switchgear 172 can result in linear displacement of the drive rod 158, which can facilitate a change in the condition of the electrical switch assembly 100 from one of the open and closed conditions to the other of the open and closed conditions.

The first end 176*a* of the drive rod 158 can be directly or indirectly coupled to the male pin contact 156. The male pin contact 156 extends between a first end 178*a* and a second end 178*b* of the male pin contact 156, and is disposed within the bore 120 of the housing 104. The male pin contact 156 can include a pin body 180 an insulating tip 182. The insulating tip 182 can be coupled to the pin body 180, and extends to the first end 178*a* of the male pin contact 156. For example, according to the illustrated embodiment, the insulating tip 182 can be securely mounted in a recess 184 (FIG. 4) formed in an upper portion 186 of the pin body 180. Thus, as shown in at least FIGS. 1-5, according to the illustrated embodiment, the upper portion 186 of the pin body 180 can have an outer size, such as, for example, diameter, that is larger than a corresponding outer size of the insulating tip 182. However, the insulating tip 182 can be securely coupled to the male pin contact 156 in a variety of other manners, including, for example, via a mechanical fastener, including, but not limited to a pin, screw, or bolt, a press fit, a threaded engagement, or via an adhesive, among other manners of attachment. Further, the insulating tip 182 can be made from a variety of electrically non-conductive materials, including, but not limited to, plastic or silicon, among other non-conductive materials.

The second end 178*b* of the male pin contact 156 is configured and adapted to attach, or otherwise be coupled to, the drive rod 158 such that the male pin contact 156 is axially movable within the bore 120 of the housing 104 via the displacement of the drive rod 158. Such movement of the male pin contact 156 can transition the male pin contact 156 from an open position (FIGS. 1, 4, and 6) to a closed position (FIGS. 2, 5, and 7), and thus transition the electrical switch assembly 100 from the open condition to the closed condition, and vice versa.

As shown by at least FIGS. 1-3, the switch contact assembly 132 can also include an isolating sleeve 188 that is constructed from an electrically non-conductive, or insulative, material, including, for example, plastic. The isolating sleeve 188 can be structured and position about a portion of the outer surface of the pin body 180 of the male pin contact 156 so as to reduce electrical stresses around the male pin contact 156. The insulative isolating sleeve 188 can be constructed from a variety of different non-conductive materials, and can be applied or coupled to outer surfaces of the pin body 180 in a variety of different manners. For example, according to certain embodiments, the insulative isolating sleeve 188 can be an acrylic coating that is applied to at least a portion of the outer surface, such as, for example, outer diameter(s), of at least a portion of the pin body 180.

Figure 4:
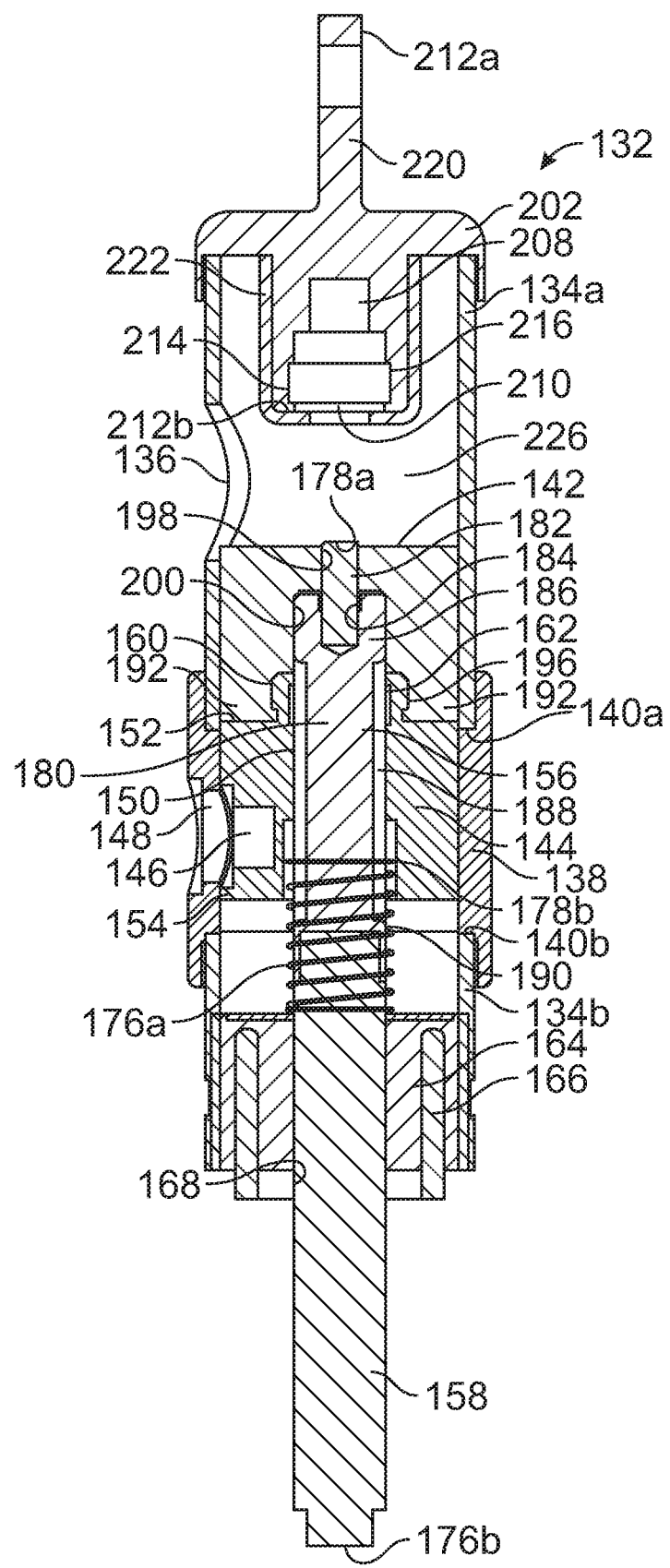
FIG. 4 illustrates a cross sectional view of the switch contact assembly shown in FIG. 3 in an open position.

When the male pin contact 156 is in the open positon, as shown, for example, by FIGS. 1 and 4, the first contact 162, such as, for example, the plurality of louvers of the primary contact 144, can be contact with the isolating sleeve 188, and thus not in electrical communication with the first contact 162. The isolating sleeve 188 thereby allows the male pin contact 156 to be de-energized, as well as be isolated in the event that the electrical switch assembly 100 is accidently re-energized through the male pin contact 156. Further, when the male pin contact 156 is axially displaced to the closed position, as shown in FIGS. 2 and 5, the position of the male pin contact 156 and isolating sleeve 188 are adjusted relative to the first contact 162 of the primary contact 144 such at that an electrically conductive portion of the male pin contact 156 is in electrical contact with the first contact 162, and thus electrically coupled to the primary contact 144.

Figure 5:
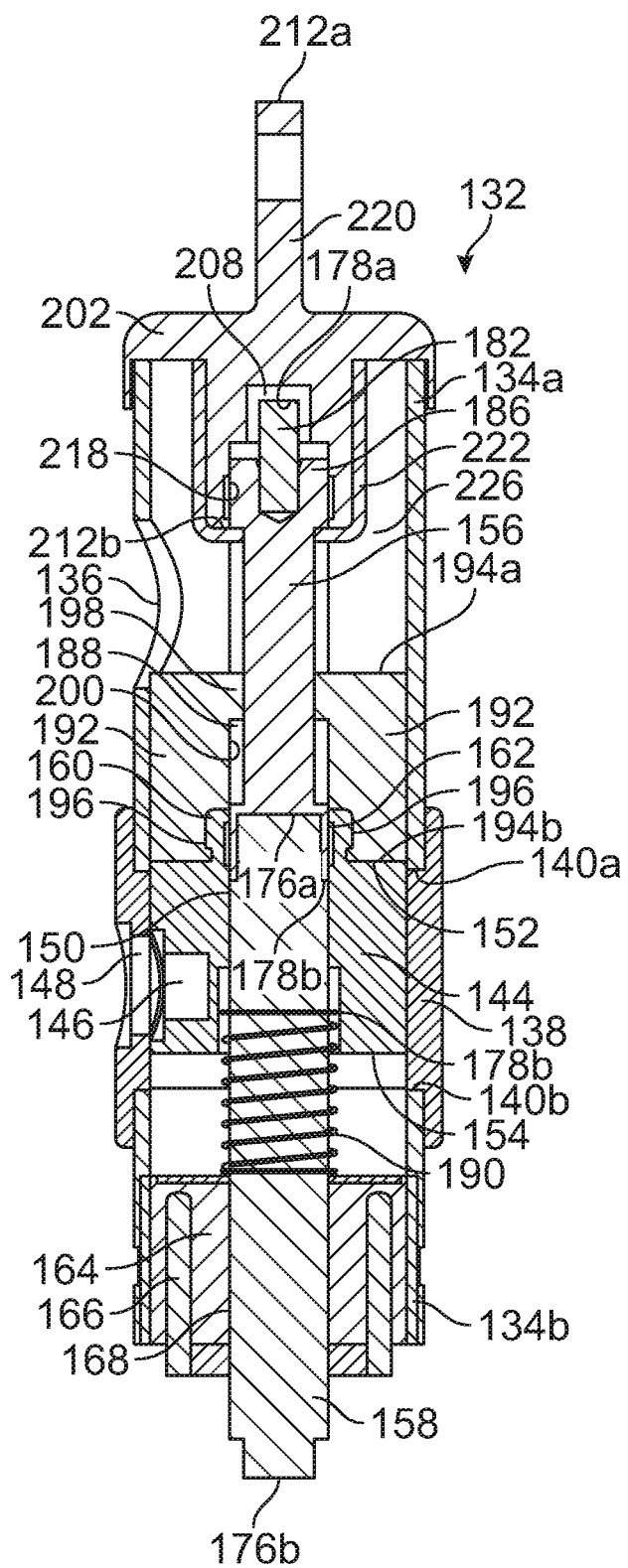
FIG. 5 illustrates a cross sectional view of the switch contact assembly shown in FIG. 3 in a closed position.
Figure 6:
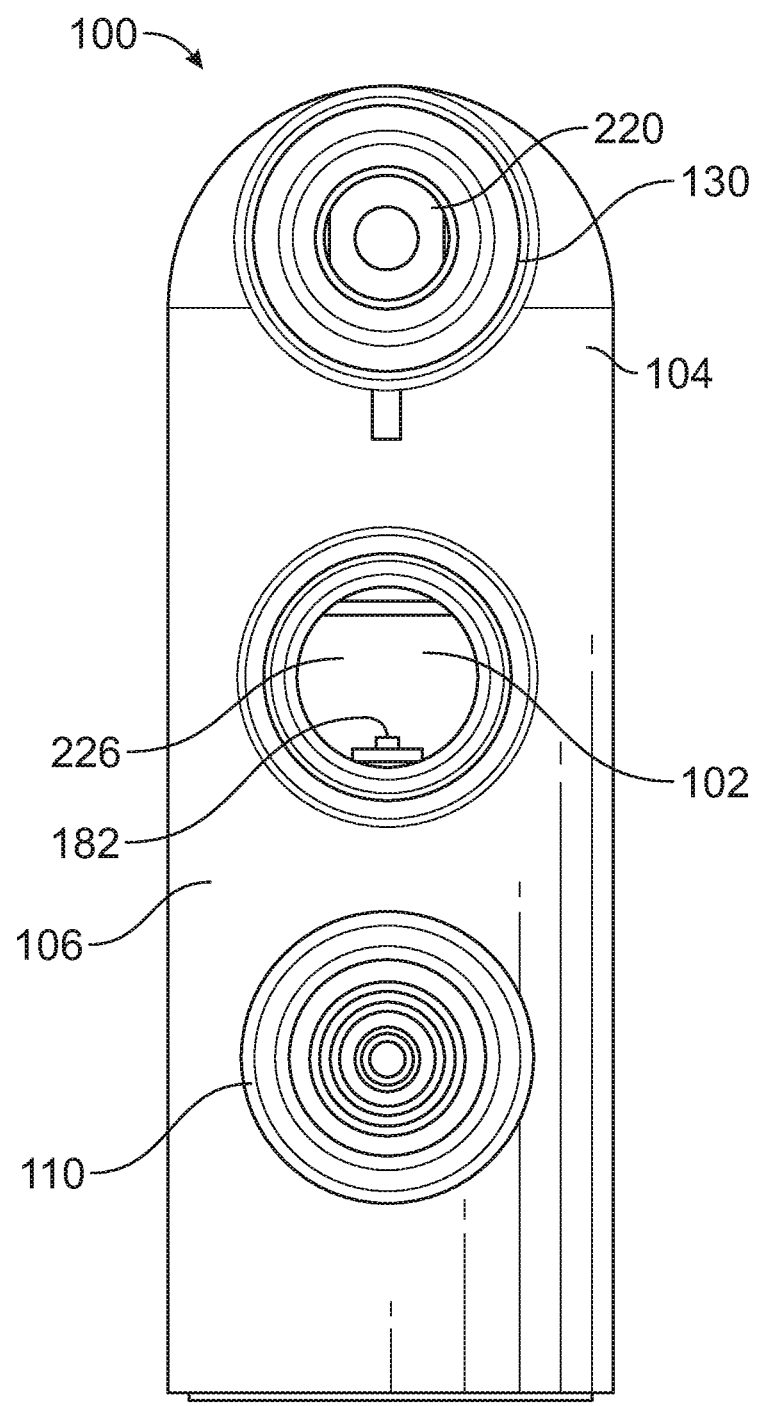
FIG. 6 illustrates a front view of the electrical switch assembly shown in FIG. 1, and includes a view through a viewing window indicating the contacts are in the open position.

Additionally, as shown in at least FIGS. 3-5, according to certain embodiments, a biasing element 190, such as, for example, a spring, can extend at least between the primary contact 144 and the lower insulative diaphragm 164. Moreover, according to certain embodiments, the biasing element 190 can extend into the primary contact 144 and provide a biasing force that may at least assist in retaining relative positions of the primary contact 144 and the lower insulative diaphragm 164.

The switch contact assembly 132 can also include an upper insulative diaphragm 192 that can be disposed immediately, or directly, above the primary contact 144. Similar to the lower insulative diaphragm 164, the upper insulative diaphragm 192 can be constructed from an electrically non-conductive material, such as, for example, silicone, and may, or may not, also include supporting ribs 166. Additionally, the upper insulative diaphragm 192 can be structured and positioned to at least assist, which the male contact pin 156 is in the open position, in electrically isolating the male pin contact 156 to prevent potential arcing between at least the male pin contact 156 and a female socket contact 202.

As shown by at least FIG. 4, the upper insulative diaphragm 192 extends between a first side 194*a* and a second side 194*b*. According to certain embodiments, the upper insulative diaphragm 192 can include a counter bore 196 that is sized to receive at least a portion of the upper hub 160 of the primary contact 144, including, for example, at least a portion of the upper hub 160 of the primary contact 144 that houses the first contact 162. As shown in at least FIGS. 4 and 5, the counter bore 196 can inwardly extend from the second side 194*b* of the upper insulative diaphragm 192. Thus, according to the illustrated embodiment, when assembled, the counter bore 196 of the upper insulative diaphragm 192 may receive the upper hub 160 of the primary contact 144 while the second side 194*b* of the upper insulative diaphragm 192 is abutted against, or otherwise adjacent to, the upper surface 152 of the primary contact 144.

The upper insulative diaphragm 192 can also include a first bore 198 and a second bore 200, the first bore 192 extending inwardly from the first side 194*a* of the upper insulative diaphragm 192, and the second bore 200 being positioned between the first bore 198 and the counter bore 196. Additionally, the second bore 200 can have a size, such as, for example, diameter, that is similar to the central hole 150 of the primary contact 144 and/or the outer size of the upper portion 186 of the pin body 180 of the male pin contact 156. Additionally, the size, such as, for example, diameter, of the second bore 200 can be larger than the similar corresponding size, such as, for example, diameter, of the first bore 198. Moreover, the first bore 198 can have a size, such as, for example, diameter, that is the same as, or similar to, the outer size, such as, for example, diameter, of the insulating tip 182 of the male pin contact 156. Moreover, according to certain embodiments, the first bore 198 may have an internal size, such as, for example, diameter, that is configured to form an interference fit with the outer size of the insulating tip 182 of the male pin contact 156 when the male pin contact 156 is at the closed position, as shown for example in at least FIGS. 1 and 4. According to such an embodiment, the relative tightness or closeness of fit between the first bore 198 of the upper insulative diaphragm 192 and the corresponding outer size of the insulating tip 182 may prevent potential arcing between at least the male pin contact 156 and a mating female socket contact 202 of the switch contact assembly 132 while the male pin contact 156 is at the open position. Additionally, as shown by at least FIGS. 1 and 4, when the male pin contact 156 is at the open position, and thus the electrical switch assembly 100 is in the open condition, a top surface of the insulating tip 182 can be generally flush with the first side 194*a* of the upper insulative diaphragm 192.

According to certain embodiments, when the male pin contact 156 is to be displaced from the open position, as shown in FIGS. 1 and 4, to the closed position, as shown in FIGS. 2 and 5, and thus the electrical switch assembly 100 is to be changed from being in the open condition to the closed condition, the switchgear 172, such as that depicted for example in FIG. 8 can be operated. Moreover, a first handle 204 of the switchgear 172 can be utilized to provide a force that is transmitted via an associated linkage 206 to the drive rod 158 to axially displace the drive rod 158, and thus the male pin contact 156, in a first direction generally toward the female socket contact 202. Such movement of the male pin contact 156 can remove the insulating tip 182 from the first bore 198 of the upper insulative diaphragm 192, and result in the larger upper portion 186 of the pin body 180 entering into the first bore 198. As the first bore 198 of the upper insulative diaphragm 192 has a size that is the same as, or similar to, the outer size of the smaller insulating tip 182, receipt of the larger upper portion 186 of the pin body 180 into the first bore 198 can result in a degree of deformation, deflection, bending and/or compression of the upper insulative diaphragm 192 so that at least a portion of the upper portion 186 of the pin body 180 can enter and/or pass through the first bore 198 of the upper insulative diaphragm 192, as seen in FIGS. 2 and 5. According to certain embodiments, at least portions of the upper portion 186 of the pin body 180 may have shapes and/or features, such as, for example chamfered or rounded corners or other transitions, that can facilitate the entrance and/or removal of the upper portion 186 of the pin body 180 into/from the first bore 198 of the upper insulative diaphragm 192. Further, according to certain embodiments, at least when the male pin contact 156 is at the closed positioned, a portion of the male pin contact 156 and/or the isolating sleeve 188 having a smaller outer size, such as, for example, diameter, than the upper portion 186 of the pin body 180, may be positioned in the second bore 200.

Conversely, when the male pin contact 156 is to be displaced from the closed position to the open position, and thus the electrical switch assembly 100 is to be changed from being in the closed condition to the open condition, the first handle 204 may be utilized to provide a force that is transmitted via the associated linkage 206 to the drive rod 158 to axially displace the drive rod 158, and thus the male pin contact 156, in a second direction generally away from the female socket contact 202. As the male pin contact 156 is moved back toward the open position, the upper portion 186 of the pin body 180 may be withdrawn from the first bore 198 of the upper insulative diaphragm 192. Such withdrawal of the upper portion 186 of the pin body 180 from the first bore 198 of the upper insulative diaphragm 192 may coincide with the insulating tip 182 returning to the first bore 198 of the upper insulative diaphragm 192. Further, with the upper portion 186 of the pin body 180 and associated forces removed from the first bore 198, the first bore 198 can generally return to a size that again provides a relatively tight fit around the insulating tip 182 in a manner that again prevents potential arcing between at least the male pin contact 156 and the mating female socket contact 202.

The female socket contact 202, which is constructed from an electrically conducting material, such as, for example, copper or aluminum, among other materials, can be disposed in a top portion of the bore 120 of the housing 104. The female socket contact 202 can be generally stationary is and configured to receive at least the insulating tip 182 and upper portion 186 of the pin body 180 of the male pin contact 156 when the male pin contact 156 is in the closed position. More specifically, according to certain embodiments, the female socket contact 202 includes a socket recess 208 that extends through an opening 210 in a second end 212*b* of the female socket contact 202. The socket recess 208 is configured to receive at least the insulating tip 182 and upper portion 186 of the pin body 180 of the male pin contact 156. Additionally, according to certain embodiments, the socket recess 208 can be defined at least in part by a flange 214 and a contact groove 216 that are positioned in general proximity to the opening 210. According to such embodiments, the flange 214 and contact groove 216 can be configured to relatively tightly engage the male pin contact 156 in a manner that can provide a frictional clamping force to prevent axial movement after the engagement of the pin contact 156 and the female socket contact 202 when the male pin contact 156 is in the closed position. Additionally, according to certain embodiments, similar to the primary contact 144, the female socket contact 202 can include a second contact 218 (FIG. 5) having a plurality of louver or rib style contacts that are configured to transmit electrical power from the male pin contact 156 to the female socket contact 202. Thus, when the male pin contact 156 is in the closed position, opposing ends of the male pin contact 156 are in electrical contact with the first and second contacts 162, 218, and thus the male pin contact 156 is electrically coupled to both the primary contact 144 and the female socket contact 202. In such a situation, current can flow at least from the primary contact 144, through the male pin contact 156, and to the female socket contact 202.

A first end 212a of the female socket contact 202 can include a contact extention 220 that can extend into the passageway 128 of the connector 130 of the electrical switch assembly 100. As previously mentioned, according to certain embodiments, the connector 130 is a female connector that can provide an IEEE 386 female interface for coupling to the switchgear, among other electrical components or connectors. As shown by at least FIG. 3, the passageway 128 of the female connector 130 is configured to accommodate an IEEE 386 600 amp interface connection.

As shown by at least FIG. 3, the switch contact assembly 132 can also include a female contact-insulating sleeve 222 that can be configured to generally surround a substantial portion of an outer surface of the female socket contact 202. Moreover, the female contact-insulating sleeve 222 can be configured to surround at least a portion of the female socket contact 202 to reduce electrical stresses around the female socket contact 202. Thus, according to the illustrated embodiment, the female contact-insulating sleeve 222 can be constructed from a non-conductive material, such as, for example, silicone, plastic, or rubber, among other materials. Further, the female contact-insulating sleeve 222 can include an orifice 224 (FIG. 3) that, when the female contact-insulating sleeve 222 is positioned about the female socket contact 202, is generally aligned with the opening 210 of the female socket contact 202. According to certain embodiments, the orifice 224 of the can have a size, such as, for example, a diameter, that is generally the same as the size of the opening 210 of the female socket contact 202.

According to certain embodiments, the second end 212b of the female socket contact 202 and/or the associated portion of the female contact-insulating sleeve 222 can be separated from the first side 194a of the upper insulative diaphragm 192 so as to form, or generally define at least a portion of, a gap chamber 226 therebetween. According to certain embodiments, the gap chamber 226 is configured to provide an approximately two inch (2") air gap between the upper insulative diaphragm 192 and the female socket contact 202 and/or female contact-insulating sleeve 222. Such a configuration of the switch contact assembly 132, and in particular the design of the upper insulative diaphragm 192, insulating tip 182, female contact-insulating sleeve 222, and/or the female socket contact 202 accommodate the gap chamber 226 providing insulation via use of air and without reliance on other supplemental insulation mediums, including, for example, without an oil insulating medium in the gap chamber 226. Moreover, when the male pin contact 156 is in the open position, in addition to the isolating sleeve 188, and not the male pin contact 156, being in in contact with the first contact 162 of the primary contact 144, the upper insulative diaphragm 192, lower insulative diaphragm 164, and insulating tip 182 allow the electrical switch assembly 100 to hold off voltage and current with air being used as an insulating medium in the gap chamber 226. Accordingly, due to its higher insulating properties, such a configuration allows air in the gap chamber 226 to be used as an insulating mechanism in a relatively small envelope.

Figure 7:
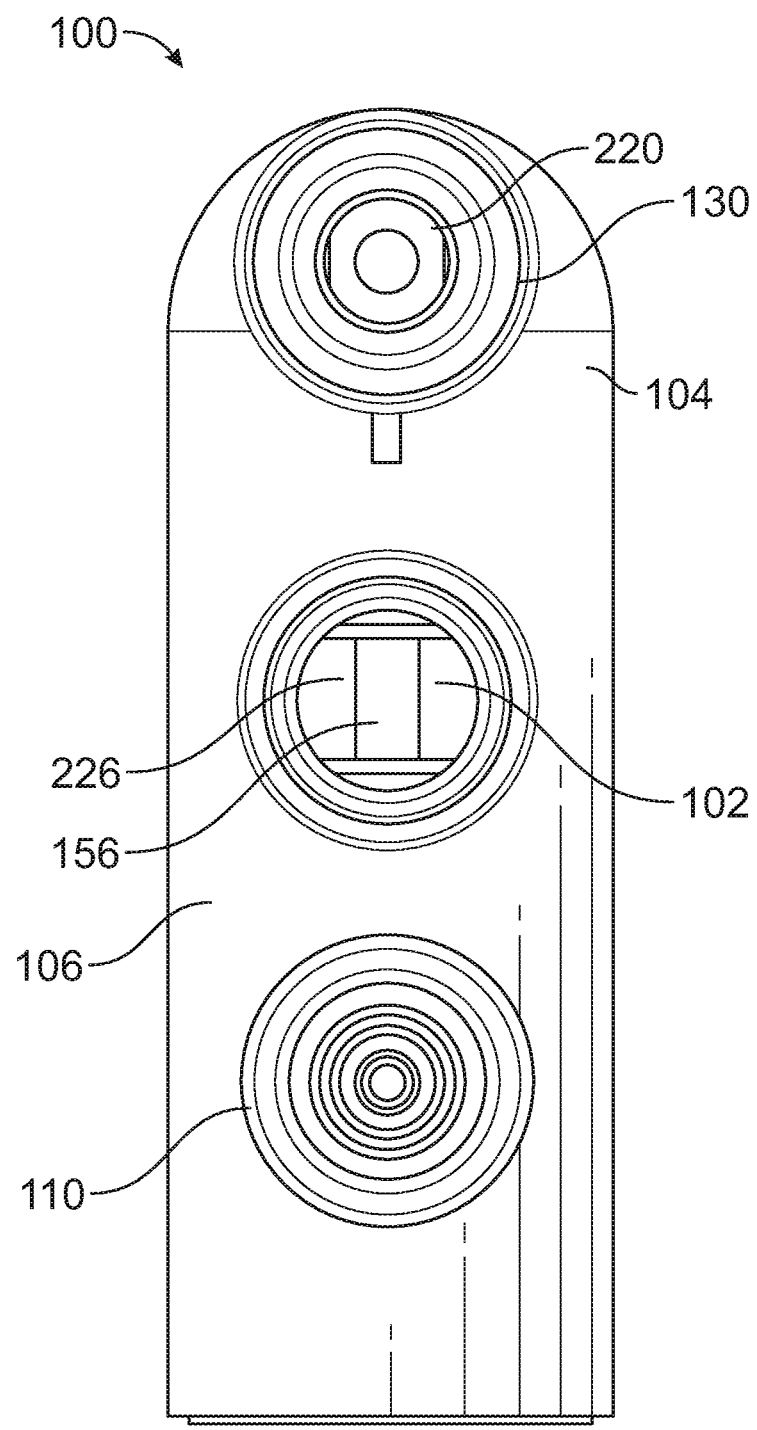
FIG. 7 illustrates a front view of the electrical switch assembly in FIG. 2, and includes a view through the viewing window indicating the contacts are in the closed position.

As shown by at least FIGS. 1, 2, 6, and 7, the electrical switch assembly 100 can further include a viewing window 102 that can be positioned and configured for provide visual confirmation of the open and closed position of the male pin contact 156, and thus confirmation as to whether the electrical switch assembly 100 is in the open or closed condition. According to certain embodiments, the viewing window 102 can be defined on the housing 104 and positioned such that the gap chamber 226 in the bore 120 of the housing 104 can be viewed therethrough. Further, as previously discussed, the viewing window 102 can be generally aligned with the opening 136 in the upper sleeve 134a so that the upper sleeve 134a does not prevent viewing of the gap chamber 226. Such visual confirmation can, for example, confirm based on the position of the male pin contact 156 as seen through the viewing window 102 whether the male pin contact 156 was moved to, via operation of the first handle 204 of the switchgear 172, and/or is in, one of the open position (FIG. 6) and closed position (FIG. 7).

The viewing window 102 can be constructed from a variety of materials. For example, according to certain embodiments, the viewing window 102 is lens made of a transparent material. However, any insulating material having a transparency characteristic can be used as the viewing window 102. The electrical switch assembly 100 can further include a protective cap that is configured to fit relatively tightly over at least a portion of the viewing window 102 in a manner that can protect the viewing window 102.

The exemplary switchgear 172 depicted in FIG. 8 can also include, among other components, a second handle 230 that can be configured to prevent out-of-sequence operation. Morevoer, the second handle 230 can be configured to allow an interlocking portion of the switchgear 172 to either prevent or allow the illustrated electrical switch assemblies 100 from being operated. Thus, the second handle 230 can lock or unlock the motion of the electrical switch assembly 100 that is associated with operation of the first handle 204. Further, while the exemplary switchgear 172 is depicted being used with three electrical switch assemblies 100, the number of electrical switch assemblies 100 used with a particular switchgear 172 can vary. For example, according to certain embodiments, a single electrical switch assembly 100 can be used with a switchgear.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An apparatus comprising:
   a housing defining a bore;
   a primary contact positioned within the bore;
   a female socket contact positioned within the bore;
   a male pin contact axially displaceable within the bore between a first position and a second position, the male pin contact having an insulating tip and a pin body, the insulating tip coupled to an upper portion of the pin body, the insulating tip having a first outer size, the upper portion of the pin body having a second outer size, the second outer size being larger than the first outer size; and
   an upper insulative diaphragm having a first bore, the first bore having a first inner size that is approximately the same as the first outer size of the insulating tip;
   wherein, when at the first position, the insulating tip, and not the upper portion of the pin body, is positioned within the first bore and the male pin contact is not electrically coupled to the primary contact and the female socket contact,
   wherein, the upper insulative diaphragm is configured to accommodate passage of at least a portion of the upper portion of the pin body as the male pin contact is axially displaced between the first position and the second position, and
   wherein, when at the second position, the male pin contact is in electrical communication with both the primary contact and the female socket contact.

2. The apparatus of claim 1, wherein each of the first outer size of the insulating tip and the second outer size of the upper portion are outside diameters, and wherein the first inner size of the first bore is an inner diameter.

3. The apparatus of claim 1, wherein the first outer size of the insulating tip is sized to have an interference fit with the first bore when the male pin contact is in the first position.

4. The apparatus of claim 1, wherein the primary contact has a first contact and the female socket contact has a second contact, the male pin contact being in direct electrical contact with both the first contact and the second contact when the male pin contact is in the second position.

5. The apparatus of claim 4, wherein the male pin contact further includes an isolating sleeve positioned about at least a portion of an outer surface of the male pin contact, the isolating sleeve positioned to be in direct contact with the first contact when the male pin contact is at the first position, the isolating sleeve being constructed from an electrically non-conductive material.

6. The apparatus of claim 1, wherein at least a portion of an outer surface of the female socket contact is enclosed within a female contact-insulating sleeve.

7. The apparatus of claim 6, wherein at least the female contact-insulating sleeve is separated from an opposing first side of the upper insulative diaphragm by an air gap.

8. The apparatus of claim 7, wherein the apparatus further includes a viewing window that extends through at least the housing, the viewing window positioned to provide visual access to the air gap from outside the housing.

9. The apparatus of claim 7, wherein a distance between the female contact-insulating sleeve and the opposing first side of the upper insulative diaphragm is approximately two inches.

10. The apparatus of claim 1, further including a lower insulative diaphragm, the lower insulative diaphragm and the upper insulative diaphragm both constructed from an electrically non-conductive material, the primary contact being positioned between the lower insulative diaphragm and the upper insulative diaphragm.

11. The apparatus of claim 10, further including a drive rod, the drive rod being coupled to the male pin contact, wherein the lower insulative diaphragm has an inner surface that defines an opening that accommodates reciprocal movement of the drive rod within the lower insulative diaphragm, the opening of the lower insulative diaphragm sized to have an interference fit with the drive rod.

12. An apparatus comprising:
    a housing having a bore and a male contact interface;
    an interface contact assembly, at least a portion of the interface contact assembly housed within the male contact interface;
    an upper insulative diaphragm having a first bore, the upper insulative diaphragm constructed from an electrically non-conductive material;
    a primary contact constructed from an electrically conductive material, the primary contact being positioned within the bore of the housing and electrically coupled to the interface contact assembly;
    a female socket contact constructed from an electrically conductive material and positioned within the bore of the housing, the upper insulative diaphragm being positioned between the female socket contact and the primary contact; and
    a male pin contact having an insulating tip, the male pin contact being axially displaceable between a first position and a second position along at least the primary contact and the upper insulative diaphragm, wherein the male pin contact is electrically coupled to the female socket contact when in the second position and not electrically coupled to the female socket contact when in the first position, the first bore having a first size when engaged by the insulating tip when the male pin contact is in the first position and a second size when engaged by another portion of the male pin contact when the male pin contact is in the second position, the first size being smaller than the second size.

13. The apparatus of claim 12, wherein the insulating tip is configured for an interference fit with the first bore when the male pin contact is in the first position.

14. The apparatus of claim 12, wherein the primary contact has a first contact and the female socket contact has a second contact, the male pin contact being in direct electrical contact with both the first contact and the second contact when the male pin contact is in the second position.

15. The apparatus of claim 14, wherein the male pin contact further includes an isolating sleeve positioned about at least a portion of an outer surface of the male pin contact, the isolating sleeve positioned to be in direct contact with the first contact when the male pin contact is at the first position, the isolating sleeve being constructed from an electrically non-conductive material.

16. The apparatus of claim 12, wherein at least a portion of an outer surface of the female socket contact is enclosed within a female contact-insulating sleeve.

17. The apparatus of claim 16, wherein at least the female contact-insulating sleeve is separated from an opposing first side of the upper insulative diaphragm by an air gap.

18. The apparatus of claim 17, wherein the apparatus further includes a viewing window that extends through at least the housing, the viewing window positioned to provide visual access to the air gap from outside the housing.

19. The apparatus of claim 12, further including a lower insulative diaphragm constructed from an electrically non-conductive material, the primary contact being positioned between the lower insulative diaphragm and the upper insulative diaphragm.

20. An apparatus comprising:
- a housing having an outer jacket and an insulating jacket, a portion of the insulating jacket extending from the outer jacket and configured to provide a contact interface, the contact interface being positioned around at least a portion of an interface contact assembly;
- an upper insulative diaphragm having a first bore and a second bore, the first bore having a first inner size, the second bore being in fluid communication with the first bore, the second bore having a second inner size that is larger than the first inner size;
- a lower insulative diaphragm having an inner surface that generally defines an opening through the lower insulative diaphragm, the lower insulative diaphragm positioned in an opening at an end of the housing;
- a primary contact positioned within the housing between the upper insulative diaphragm and the lower insulative diaphragm, the primary contact being electrically coupled to the interface contact assembly, the primary contact having a central hole;
- a female socket contact constructed from an electrically conductive material, at least a portion of an outer surface of the female socket contact being housed in a female contact-insulating sleeve, the upper insulative diaphragm being positioned between the female socket contact and the primary contact;
- a male pin contact extending between a first end and a second end, male pin contact including a pin body and an insulating tip, the insulating tip being positioned at the first end and coupled to an upper portion of the pin body, the insulating tip having a first outer size that is approximately the same as the first inner size of the first bore, the upper portion having a second outer size that is approximately the same as the second inner size of the second bore, at least a portion of the male pin contact being sized for reciprocal displacement within the central hole of the primary contact and the first and second bores of the upper insulative diaphragm; and
- a drive rod coupled to the second end of the male pin contact, the drive rod having an outer size that is approximately the same as an inner size of the opening of the lower insulative diaphragm.

\* \* \* \* \*